United States Patent

Preti

[11] 3,743,933
[45] July 3, 1973

[54] WAVE GUIDE
[75] Inventor: Jean Preti, Clamart, France
[73] Assignee: Societe de Fabrication d'Instruments de Mesure/S.F.I.M., Massy, France
[22] Filed: Sept. 9, 1971
[21] Appl. No.: 178,873

[30] Foreign Application Priority Data
Sept. 23, 1970 France.............................. 7034480

[52] U.S. Cl................................. 325/24, 325/446
[51] Int. Cl.............................................. H04b 1/58
[58] Field of Search...................... 325/23, 24, 446; 343/8; 333/10, 11, 31 A; 329/116

[56] References Cited
UNITED STATES PATENTS

| | | | |
|---|---|---|---|
| 2,580,678 | 1/1952 | Hansen et al. ........................ | 333/10 |
| 2,679,585 | 5/1954 | Drazy................................... | 329/116 |
| 2,739,288 | 3/1956 | Riblet ................................... | 333/10 |
| 3,079,563 | 2/1963 | Marsh .................................. | 325/346 |
| 2,810,904 | 10/1957 | Blitz..................................... | 325/24 |
| 2,834,876 | 5/1958 | Pritchard et al...................... | 333/10 |

Primary Examiner—Robert L. Griffin
Assistant Examiner—William S. Moore
Attorney—Alan H. Levine

[57] ABSTRACT

An arrangement including a main wave guide flanked by two auxiliary wave guides, all being arranged parallel to one another. Each lateral wall of the main wave guide is formed with a slot, the slots providing openings between the main wave guide and the auxiliary wave guide. The length of each slot is equal to the wave length in air of the wave which is propagated in the main wave guide. One end of one auxiliary wave guide absorbs an incident wave traveling in one direction, and one end of the other auxiliary wave guide reflects an incident wave traveling in the same direction. At its other end, each auxiliary wave guide may have a crystal for receiving energy flowing in the opposite direction toward that other end. The wave guide arrangement may form part of a detection means including a source of microwaves for providing signals traveling along the main wave guide in said one direction, an aerial for transmitting and also for providing signals traveling along the wave guide in the opposite direction, an amplifier chain connected to each of the crystals, and a phase comparator connected to the amplifier chains.

3 Claims, 2 Drawing Figures

Patented July 3, 1973

3,743,933

WAVE GUIDE

The present invention relates to a wave guide of the type having a slot thereby permitting some of the energy flowing in the guide to be drawn off laterally.

This type of wave guide is known, for example, under the name of slotted hybrid junction.

According to the present invention there is provided a slotted wave guide comprising two slots facing one another on opposite sides of the lateral wall of the wave guide, each opening laterally into a respective auxiliary wave guide which laterally flanks the wave guide and which has its axis parallel to the axis of the wave guide, the length of each slot being equal to the wave length in air of the wave which is propagated in the guide, one of the two auxiliary wave guides having an end which absorbs an incident wave, the other having an end which reflects an incident wave.

The wave guide described above provides a simple means for achieving a shift in phase between waves received by two receivers, for example two crystals.

It is sufficient for achieving this to arrange one of the crystals in each of the auxiliary wave guides, each crystal being at the end of the auxiliary wave guide which is remote from the reflecting or absorbing surface.

Referring to the accompanying drawings.

Figure 1:
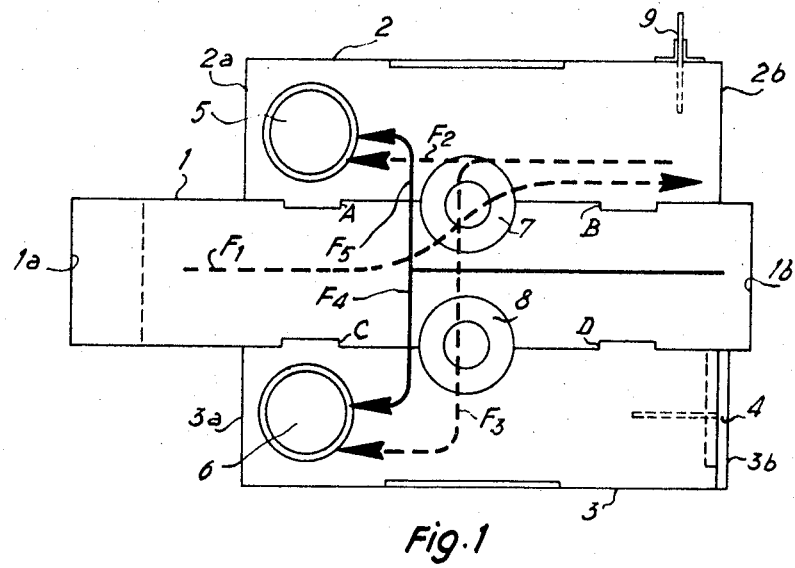
FIG. 1 is a diagram showing one embodiment of the wave guide in section.

FIG. 1 is a longitudinal section showing a main wave guide 1 flanked on two opposite sides by auxiliary wave guides 2 and 3 which communicate with the main wave guide through slots AB and CD, respectively. The lengths of the slots are equal to the wave length in air of the waves which are propagated in the guide when a source of waves is connected to the input 1a of the guide.

An end 2b of the wave guide 2 is adapted to reflect the energy received thereon, and the end 3b of the wave guide 3 comprises a load 4 adapted to absorb the energy received thereon.

The two open ends of the wave guide 1 are indicated by 1a and 1b, and the energy is flowing from the end 1a to the end 1b. A fraction F of this energy is tapped off through the guide 2 and flows in the direction of the arrow $F_1$ to the reflecting end 2b. After reflection, this energy fraction $F_1$ is further divided into a fraction $F_2$, which is directed towards the other end 2a of the guide 2, and a fraction $F_3$, which passes into the other auxiliary guide 3 in the direction of the end 3a of this guide.

Thus, the energies returned towards the ends 2a and 3a of the guides 2 and 3 are out of phase and it is found in practice that the shift in phase is of the order of 100°.

No account is taken of the energy drawn off in the direction of the end 3b of the guide 3 since this energy is absorbed by the load 4.

If the energy is flowing in the guide 1 from the end 1b towards the end 1a, fractions of this energy, which can be assumed to be identical, are tapped off by the guides 2 and 3 in accordance with the arrows $F_4$ and $F_5$, respectively.

An adjustable load 9 introduced into the guide 2 makes it possible to vary the shift in phase to which reference has been made above and, as necessary, matching studs 7 and 8 are disposed in the region of the slots.

If two crystals 5 and 6 are disposed in the regions of the ends 2a and 3a of the guides 2 and 3, the assembly forms a two-crystal duplexer and mixer such that a shift in phase exists between the energies received directly by the crystals from a transmitter connected to the end 1a of the wave guide 1.

Such a system can be used inter alia in a Doppler effect radar arrangement, which can be used for counting and controlling vehicles or other moving bodies.

Figure 2:
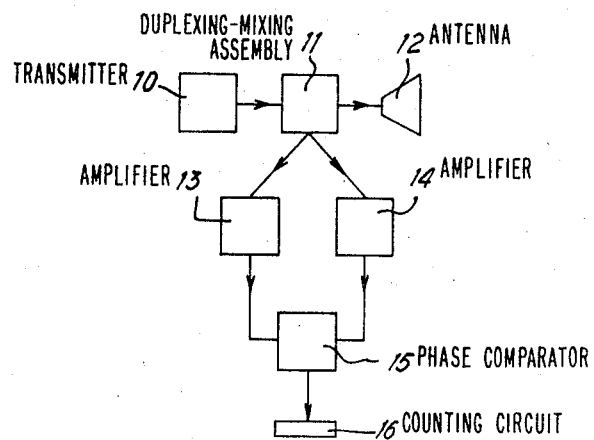
FIG. 2 is a block diagram showing an arrangement which uses the wave guide and which is intended, for example, for counting and regulating the circulation of moving bodies.

Such an arrangement is shown diagrammatically in FIG. 2, and comprises a continuous micro-wave transmitter 10 connected to one end, preferably 1a, of the central wave guide of the duplexing-mixing assembly 11 of the type shown in FIG. 1, the other end, preferably 1b, of the central wave guide being connected to a transmission and reception aerial 12. The above described connection is preferred so as to maximize the amplitude of the received signal at the crystals, since reflection at surface 2b in FIG. 1 will cause attenuation of any signal incident to such surface.

The transmitter 110 is, for example, a transmitter of the type described in the applicant's French Pat. application No. PV. 69 16 086 of the 19th May 1969, under the title: "Improvements in resonant cavities."

The two crystals 5 and 6 of the assembly 11 are connected to the inputs of two amplification chains 13, and 14, respectively, the outputs of the chains being connected to the two inputs of a phase comparator 15.

Such an arrangement functions in principle in a manner identical to that of already known arrangements such as described in the first addition No. 84,800 to French Pat. No. 1,349,431.

The signals leaving one of the crystals and which results from the beat of a signal withdrawn directly from the transmission wave and a signal withdrawn from the reception wave shows a phase difference as compared with the analogous signal leaving the other crystal, the sign of this shift in phase signifying the direction of displacement of the moving body detected by the transmission wave. The phase comparator thus supplies at its output a voltage proportional to the speed of this moving body and of which the sign depends on the direction of this speed. This voltage can be sent to a counting and control arrangement 16, for example, such as described in French Pat. No. 1,349,431.

What is claimed is:

1. A wave guide arrangement comprising a main wave guide having two opposed lateral walls and having an axis, two auxiliary wave guides each having an axis, said auxiliary wave guides flanking said walls respectively, the axes of said auxiliary wave guides being parallel to the axis of the main wave guide, a slot in each of said walls, said slots being opposite one another and providing openings between said main wave guide and said auxiliary wave guides the length of each slot being equal to the wave length in air of the wave which is propagated in said main wave guide, one of said auxiliary wave guides having an end which absorbs an incident wave traveling in one direction, the other auxiliary wave guide having an end which reflects an incident wave traveling in said one direction, the other ends of both auxiliary wave guides each being provided with energy detector means.

2. A wave guide arrangement as defined in claim 1 wherein said energy detector means are crystals.

3. Detection means comprising a main wave guide having two opposed lateral walls and having an axis, two auxiliary wave guides each having an axis, said auxiliary wave guides flanking said walls respectively, the axes of said auxiliary wave guides being parallel to the axis of the main wave guide, a slot in each of said walls, said slots being opposite one another and providing openings between said main wave guide and said auxiliary wave guides, the length of each slot being equal to the wave length in air of the wave which is propagated in said main wave guide, one of said auxiliary wave guides having an end which absorbs an incident wave traveling in one direction, the other auxiliary wave guide having an end which reflects an incident wave traveling in said one direction, the other ends of both auxiliary wave guides each being provided with detector crystals, a source of continuous microwaves connected to that end of the main wave guide which is the same relative end as the said ends of the auxiliary wave guides which are provided with crystals, a transmission and reception aerial connected to the other end of the main wave guide, an amplifier chain connected to one of the crystals, another amplifier chain connected to the other of the crystals, and a phase comparator connected to the two amplifier chains.

* * * * *